United States Patent
Carlson et al.

(10) Patent No.: US 12,271,220 B1
(45) Date of Patent: Apr. 8, 2025

(54) MANAGING MULTI-PHASE CLOCK SIGNALS FOR INTEGRATED CIRCUIT DEVICES

(71) Applicant: Auradine, Inc., Santa Clara, CA (US)

(72) Inventors: David Carlson, Haslet, TX (US); Saptadeep Pal, Cupertino, CA (US)

(73) Assignee: Auradine, Inc., Santa Clara, CA (US)

( * ) Notice: Subject to any disclaimer, the term of this patent is extended or adjusted under 35 U.S.C. 154(b) by 164 days.

(21) Appl. No.: 18/345,725

(22) Filed: Jun. 30, 2023

(51) Int. Cl.
  *G06F 1/06* (2006.01)
  *G06F 1/08* (2006.01)
  *G06F 1/10* (2006.01)

(52) U.S. Cl.
  CPC .................. *G06F 1/08* (2013.01); *G06F 1/06* (2013.01); *G06F 1/10* (2013.01)

(58) Field of Classification Search
  CPC .................. G06F 1/06; G06F 1/08; G06F 1/10
  See application file for complete search history.

(56) References Cited

U.S. PATENT DOCUMENTS

| | | | |
|---|---|---|---|
| 5,133,064 A * | 7/1992 | Hotta | G06F 1/10 327/156 |
| 2024/0203469 A1* | 6/2024 | Kang | G11C 7/222 |

* cited by examiner

*Primary Examiner* — Patrick O Neill
(74) *Attorney, Agent, or Firm* — Fish & Richardson P.C.

(57) ABSTRACT

Methods, circuits, apparatus, and systems for managing multi-phase clocking signals for integrated circuit devices are provided. In one aspect, an integrated circuit device includes: a clock signal generator configured to generate a reference clock signal and a plurality of processing units coupled to the clock signal generator. At least one of the plurality of processing units includes: a phase generator configured to selectively generate at least two sets of multi-phase clock signals based on the reference clock signal and corresponding control signals, the at least two sets of multi-phase clock signals having different respective frequencies; and a computation unit configured to perform at least one computing function based on a selected one of the at least two sets of multi-phase clock signals.

20 Claims, 6 Drawing Sheets

US 12,271,220 B1

MANAGING MULTI-PHASE CLOCK SIGNALS FOR INTEGRATED CIRCUIT DEVICES

TECHNICAL FIELD

The present disclosure relates generally to integrated circuit devices, and in particular, to methods, circuits, apparatus, and systems related to managing multi-phase clock signals in integrated circuit devices.

BACKGROUND

Circuits that generate multi-phase clock signals output a plurality of clock signals phase-shifted in equally-spaced increments relative to a reference clock signal. The output clock signals typically have the same frequency as the reference clock signal.

SUMMARY

The present disclosure describes methods, circuits, apparatus, and systems for managing multi-phase clock signals for integrated circuit devices such as processing chips.

In some implementations, a processing chip (e.g., an application specific integrated circuit (ASIC)) can include a plurality of processing units configure to be operated in parallel. The processing chip can include a clock signal generator (e.g., a phase-locked loop (PLL) circuit) configured to generate a high frequency reference clock signal based on a master clock signal (e.g., from a master clock source like a crystal oscillator). Each processing unit receives the reference clock signal from the clock signal generator into a phase generator that includes a multi-phase (e.g., three-phase) latch-based clocking architecture. The phase generator can generate at least two sets of multi-phase clock signals with different frequencies based on corresponding control signals. For example, a first set has a phase delay of 2 cycles of the reference clock signal for a same phase signal, while the second set has a phase delay of 3 cycles of the reference clock signal for a same phase signal. Accordingly, the second set can make the processing unit operate 50% slower than the first set. In such a way, different processing units in the processing chip can be configured to operate with different frequencies or speeds, e.g., based on their respective statuses (e.g., busy or idle), using just one master clock source and one PLL circuit, which can simplify a structure of the processing chip, reduce the cost, save power consumption, and improve a performance of the processing chip.

One aspect of the present disclosure features an integrated circuit device, including: a clock signal generator configured to generate a reference clock signal; and a plurality of processing units coupled to the clock signal generator. At least one of the plurality of processing units includes: a phase generator configured to selectively generate at least two sets of multi-phase clock signals based on the reference clock signal and corresponding control signals, the at least two sets of multi-phase clock signals having different respective frequencies; and a computation unit configured to perform at least one computing function based on a selected one of the at least two sets of multi-phase clock signals.

In some implementations, the integrated circuit device further includes one or more control logics. Each processing unit of the at least one of the plurality of processing units can be coupled to a respective control logic of the one or more control logics and configured to receive the corresponding control signals from the respective control logic.

In some implementations, each of the corresponding control signals includes one or more configuration bits representing multiple different states.

In some implementations, the respective control logic is configured to generate a corresponding control signal based on a status of the processing unit.

In some implementations, the respective control logic is configured to: based on a first status of the processing unit, generate a first control signal to cause the phase generator of the processing unit to generate a first set of multi-phase clock signals, and based on a second status of the processing unit, generate a second control signal to cause the phase generator of the processing unit to generate a second set of multi-phase clock signals, where a second frequency of the second set of multi-phase clock signals is lower than a first frequency of the first set of multi-phase clock signals.

In some implementations, the first frequency of the first set of multi-phase clock signals is one third of a frequency of the reference clock signal.

In some implementations, the first status includes a busy status or a fast operation status, and the second status includes an idle status or a slow operation status.

In some implementations, a same phase clock signal of the first set of multi-phase clock signals has a delay of two clock cycles of the reference clock signal, while a same phase clock signal of the second set of multi-phase clock signals has a delay of three clock cycles of the reference clock signal.

In some implementations, the phase generator includes multiple phase delay circuits and corresponding logic gates. Each of the logic gates can be configured to: receive the reference clock signal and a phase control signal from a respective phase delay circuit of the multiple phase delay circuits; and generate a respective phase clock signal for a respective phase based on the reference clock signal and the phase control signal.

In some implementations, the phase generator further includes: a series of flip-flops that are sequentially coupled to one another, each of the series of flip-flops being configured to store a respective stored value. The processing unit is configured to receive a corresponding control signal. Each of the multiple phase delay circuits is configured to: generate a respective phase control signal based on the corresponding control signal and a different corresponding set of selected stored values of the series of flip-flops.

In some implementations, the series of flip-flops include a first flip-flop, one or more middle flip-flops, and a last flip-flop that are coupled in series. The phase generator further includes a NOR logic gate having: inputs coupled to each of the first flip-flop and the one or more middle flip-flops and configured to receive stored values of the first flip-flop and the one or more middle flip-flops; and an output coupled to the first flip-flop of the series of flip-flops. Each of the series of flip-flops is configured to receive the reference clock signal.

In some implementations, the series of flip-flops include nine flip-flops, and the respective stored values stored in the series of flip-flops include m0, m1, m2, . . . , m8. The multiple phase delay circuits can include: a first phase delay circuit configured to sequentially output m0, m3, m6 as a first phase control signal when the corresponding control signal represents a lower voltage level and sequentially output m0, m4 when the corresponding control signal represents a higher voltage level, a second phase delay circuit configured to sequentially output m1, m4, m7 as a second phase control signal when the corresponding control signal represents the lower voltage level and sequentially output m1, m6 when the corresponding control signal represents the higher voltage level, and a third phase delay circuit configured to sequentially output m2, m5, m8 as a third phase control signal when the corresponding control signal represents the lower voltage level and sequentially output m3, m7 when the corresponding control signal represents the higher voltage level.

Another aspect of the present disclosure an apparatus including: a phase generator configured to selectively generate at least two sets of multi-phase clock signals based on a reference clock signal and corresponding control signals, the at least two sets of multi-phase clock signals having different respective frequencies; and a computation unit configured to perform at least one computing function based on a selected one of the at least two sets of multi-phase clock signals.

In some implementations, the phase generator includes: multiple phase delay circuits and multiple logic gates. Each of the logic gates is configured to: receive the reference clock signal and a phase control signal from a respective phase delay circuit of the multiple phase delay circuits; and generate a respective phase clock signal for a respective phase based on the reference clock signal and the phase control signal.

In some implementations, the phase generator further includes: a series of flip-flops that are sequentially coupled to one another, each of the series of flip-flops being configured to store a respective stored value. The apparatus is configured to receive a corresponding control signal, and each of the multiple phase delay circuits is configured to: generate a respective phase control signal based on the corresponding control signal and a different corresponding set of selected stored values of the series of flip-flops.

In some implementations, the series of flip-flops include a first flip-flop, one or more middle flip-flops, and a last flip-flop that are coupled in series. The phase generator can further include a NOR logic gate having: inputs coupled to each of the first flip-flop and the one or more middle flip-flops and configured to receive stored values of the first flip-flop and the one or more middle flip-flops; and an output coupled to the first flip-flop of the series of flip-flops. Each of the series of flip-flops can be configured to receive the reference clock signal.

In some implementations, the series of flip-flops include nine flip-flops, and the respective stored values stored in the series of flip-flops include m0, m1, m2, . . . , m8. The multiple phase delay circuits can include: a first phase delay circuit configured to sequentially output m0, m3, m6 as a first phase control signal when the corresponding control signal represents a lower voltage level and sequentially output m0, m4 when the corresponding control signal represents a higher voltage level, a second phase delay circuit configured to sequentially output m1, m4, m7 as a second phase control signal when the corresponding control signal represents the lower voltage level and sequentially output m1, m6 when the corresponding control signal represents the higher voltage level, and a third phase delay circuit configured to sequentially output m2, m5, m8 as a third phase control signal when the corresponding control signal represents the lower voltage level and sequentially output m3, m7 when the corresponding control signal represents the higher voltage level.

In some implementations, the phase generator is configured to: receive a first control signal and generate a first set of multi-phase clock signals based on the first control signal and the reference clock signal; and receive a second control signal and generate a second set of multi-phase clock signals based on the second control signal and the reference clock signal. The second control signal can indicate an idle status, and the first control signal can indicate a busy status. A second frequency of the second set of multi-phase clock signals can be lower than a first frequency of the first set of multi-phase clock signals.

Another aspect of the present disclosure features a method, including: generating a reference clock signal; generating a first control signal based on a status of a first processing unit, and generating a first set of multi-phase clock signals for the first processing unit based on the reference clock signal and a first control signal; and generating a second control signal based on a status of a second processing unit, and generating a second set of multi-phase clock signals for the second processing unit based on the reference clock signal and a second control signal. The second control signal is different from the first control signal, and the second set of multi-phase clock signals has a different frequency from the first set of multi-phase clock signals.

In some implementations, each of the first processing unit and the second processing unit is configured to: generate the first set of multi-phase clock signals based on the first control signal, and generate the second set of multi-phase clock signals based on the second control signal.

The techniques implemented herein enable a processing unit to increase phase delays between clocking elements in a multiphase clocking architecture without changing a master clock source (or root clock source). Accordingly, the processing unit can have different operation speeds or frequencies based on its status (e.g., busy or idle), which can also reduce power consumption. For a processing chip integrating a large number of processing units, due to process variation, some processing units may be substantially slower than other processing units. The processing chip can run the slower processing units with a lower frequency/slower speed and run the remaining processing units with a higher frequency/higher speed, with a single shared master clock source and a single shared PLL circuit. This is in contrast to conventional solutions that use two or more master clock sources and two or more PLL circuits; the techniques implemented herein can accordingly reduce the amount of circuitry on the processing chip, reduce the cost, save power consumption, and improve a performance of the processing chip. The techniques can be applied to any devices or systems that use phase generators to generate different phase delays.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

Figure 1:
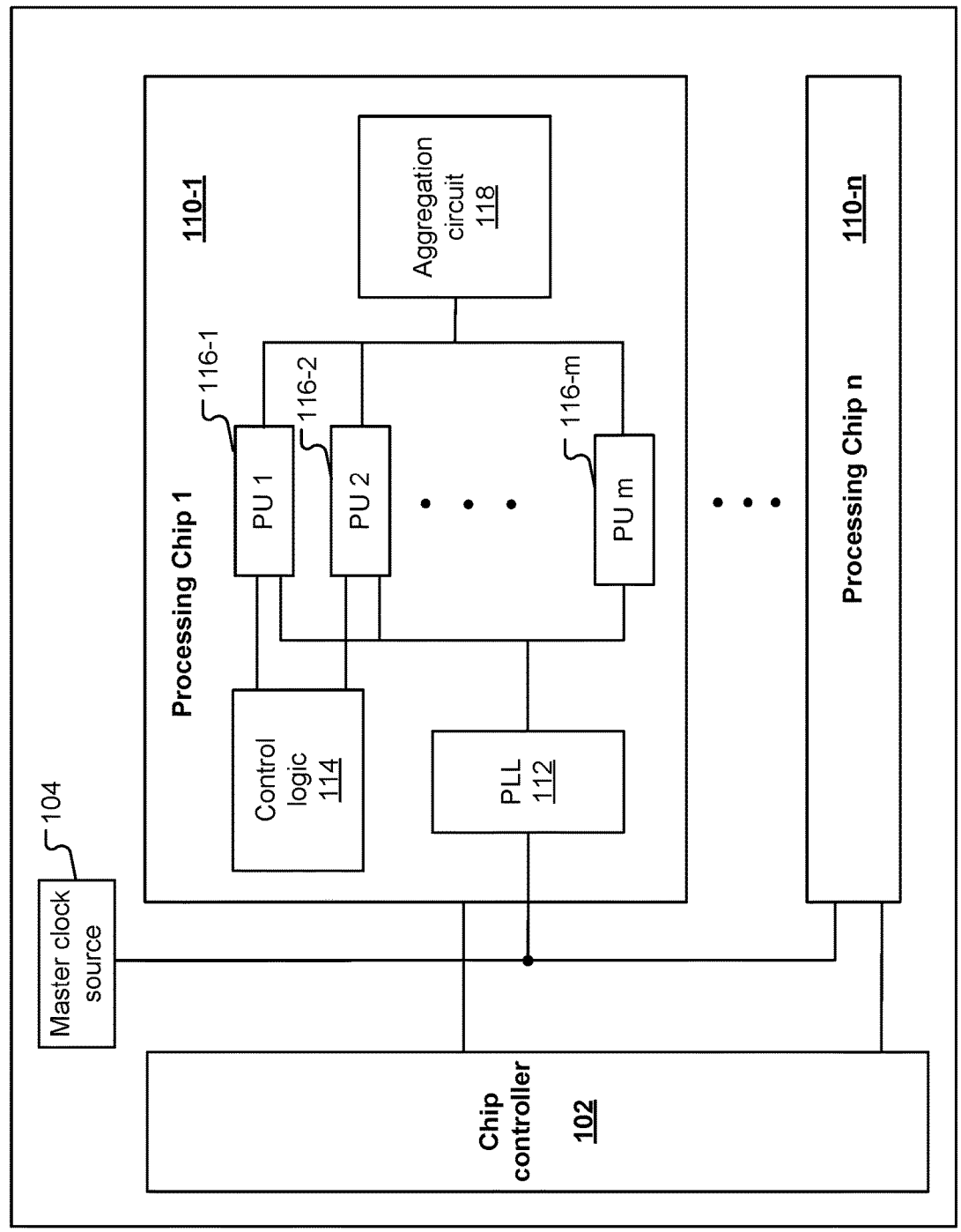
FIG. 1 illustrates a block diagram of an example system, according to one or more implementations of the present disclosure.

FIG. 1 illustrates a block diagram of an example system 100, according to one or more implementations of the present disclosure. The system 100 can be an integrated system integrating a number of processing chips for high performance operations.

In some implementations, the system 100 includes a plurality of processing chips 110-1, ..., 110-n (referred to generally as processing chips 110 and individually as processing chip 110), where n is an integer. In some examples, n is over 100, e.g., n=400, etc. As illustrated in FIG. 1, the system 100 can include a chip controller 102 coupled to each of the plurality of processing chips 110 and configured to control operations of the plurality of processing chip 110. In some examples, the chip controller 102 sends a command or request to a processing chip 110 to perform an operation and receives a result of the operation from the processing chip 110. In some examples, as discussed in further detail below, the chip controller 102 checks a status of the processing chip 110 or a status of a processing unit in the processing chip 110 and controls to generate a corresponding control signal for the processing unit in the processing chip 110. In some examples, the chip controller 102 includes one or more processors or central processing units (CPUs) and/or one or more memories storing programming instructions executable by the one or more processors. The chip controller 102 can be an integrated chip (IC).

In some implementations, as illustrated in FIG. 1, the system 100 includes a master clock source 104 configured to generate a master clock signal. The master clock source 104 can be a crystal oscillator configured to generate the master clock signal with a fixed and stable frequency, e.g., within a range from 1 MHz to over 100 MHz. Each processing chip 110 can receive the master clock signal from the master clock source 104. The chip controller 102, the plurality of processing chips 110, and/or the master clock source 104 can be integrated on a same substrate (or board) and/or packaged in a same package.

In some implementations, as illustrated in FIG. 1, a processing chip 110 includes a plurality of processing units (PUS) 116-1, 116-2, ..., 116-m (referred to generally as processing units 116 and individually as processing unit 116), where m is an integer. In some examples, m is over 100, e.g., m=254, 255, 256, etc. The processing chip 110 can also include a clock signal generator 112. The clock signal generator 112 can be a phase-locked loop (PLL) circuit 112. For illustration purpose, the PLL circuit 112 is described as an example of the clock signal generator 112. The PLL circuit 112 is configured to receive the master clock signal from the master clock source 104 and generate a reference clock signal that has a higher frequency than the frequency of the master clock signal. In some examples, the reference clock signal has a frequency, e.g., over 1 GHz. Each processing unit 116 can be configured to operate based on the reference clock signal to achieve a high operation speed. The processing chip 110 can be configured to operate multiple processing units 116 in parallel to perform one or more operations.

In some implementations, the processing chip 110 includes an aggregation circuit 118 coupled to the plurality of processing units 116 and configured to aggregate results from the plurality of processing units 116 and send the aggregated results (or a processed result based on the aggregated results) to the chip controller 102.

In some examples, the processing chip 110 is a bitcoin mining chip configured to operate the plurality of processing units in parallel. Each processing unit 116 in the processing chip 110 can be configured to perform a bitcoin double hash operation to find a nonce which meets a supplied difficulty threshold. The processing chip 110 can include an ASIC (application-specific integrated circuit) or an FPGA (field-programmable gate array).

As discussed in further detail below, a processing chip 110 can be configured to run different processing units 116 with different operation speeds or frequencies using a same reference clock signal from the PLL circuit 112. In some implementations, the processing chip 110 includes one or more control logics (or configuration logics) 114. Each control logic 114 can be coupled to one or more processing units 116. A processing unit 116 is coupled to a respective control logic 114 and configured to receive a corresponding control signal from the respective control logic 114. In some implementations, e.g., as shown in FIG. 1, the respective control logic 114 is externally coupled to the processing unit 116. In some implementations, a processing unit 116 includes an internal control logic that is same as, or similar to, the respective control logic 114.

The respective control logic 114 can be configured to generate the corresponding control signal for the processing unit 116 based on a status of the processing unit 116. For example, the chip controller 102 can obtain the status of the processing unit 116 and send a command associated with the status of the processing unit 116 to the respective control logic 114 to generate the corresponding control signal for the processing unit 116.

In some examples, if the status of the processing unit 116 is idle or slow, the respective control logic 114 generates a corresponding control signal to cause the processing unit 116 to operate at a lower frequency, e.g., as discussed in further detail in FIGS. 3, 4A-4C, and 5A-5B. In some examples, if the status of the processing unit 116 is busy or in a fast operation, the respective control logic 114 generates a corresponding control signal to cause the processing unit 116 to operate at a higher frequency (e.g., a same frequency as the reference clock signal), e.g., as discussed in further detail in FIGS. 3, 4A-4C, and 5A-5B.

The corresponding control signal includes one or more bits representing multiple states. In some examples, the corresponding control signal includes 1 bit representing 2 states, 0, 1. The respective control logic 114 can be coupled to the processing unit 116 via a single electronic wire. The states can include: a first state 0 represents running at a normal (or faster) speed, and a second state 1 represents running at a slower speed (or a retarded speed). In some examples, the corresponding control signal includes 2 bits representing 4 states, e.g., 00, 01, 10, 11. The respective control logic 114 can be coupled to the processing unit 116 via two electronic wires, each transmitting a respective bit. The states can include: a first state 00 represents running at a normal (or faster) speed, a second state 01 represents disabling, a third state 11 represents running at a slower speed (or a retarded speed), and a fourth state 10 (unused in the present disclosure).

Figure 2:
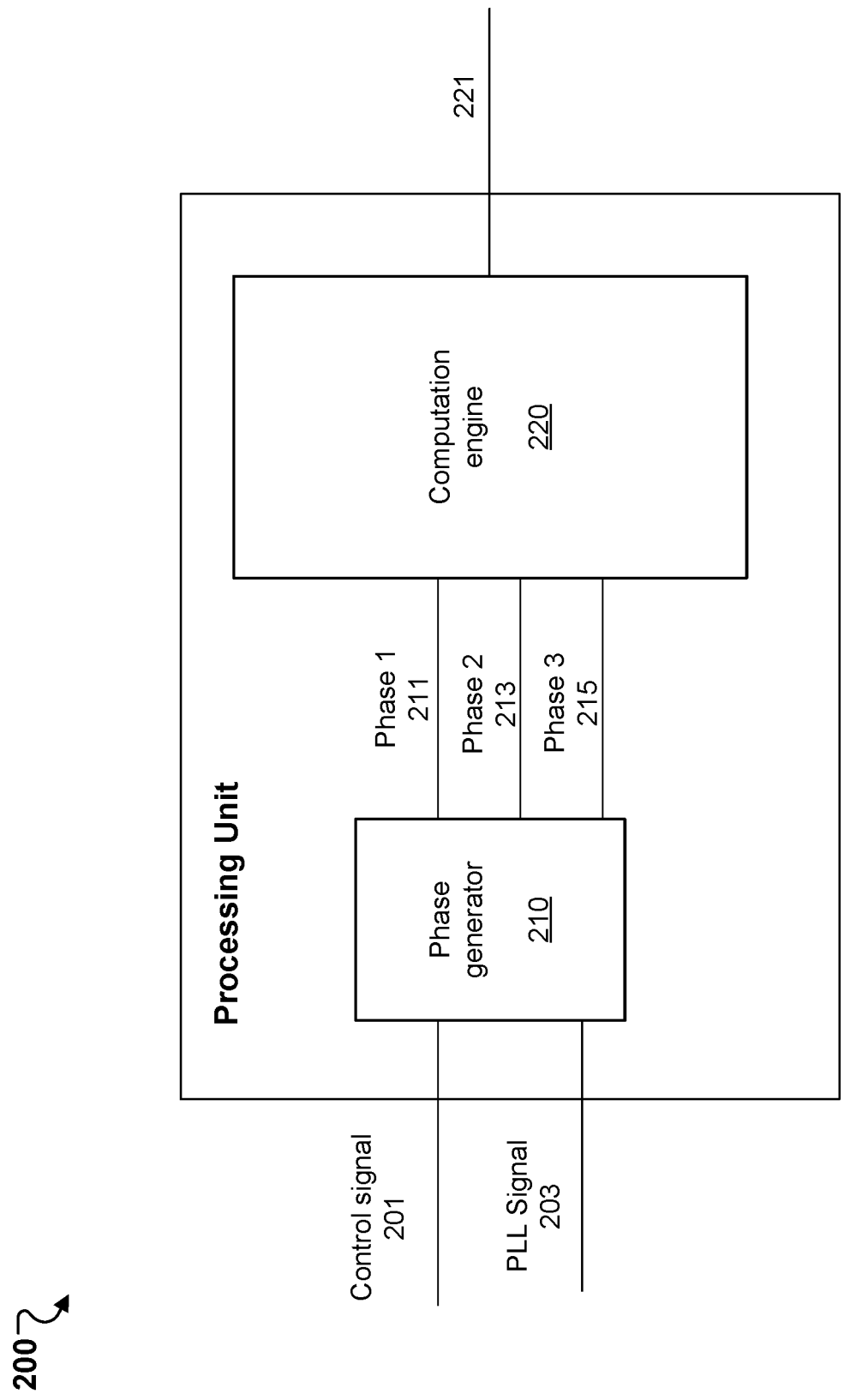
FIG. 2 illustrates a block diagram of an example processing unit, according to one or more implementations of the present disclosure.

FIG. 2 illustrates a block diagram of an example processing unit 200, according to one or more implementations of the present disclosure. The processing unit 200 can be implemented as the processing unit 116 of FIG. 1. The processing unit 200 is configured to generate a multi-phase clock signal. For illustration purposes, the multi-phase clock signal has three phases that are different from each other. For example, the three phases can have a phase difference of 120° (120 degrees).

Figure 5A:
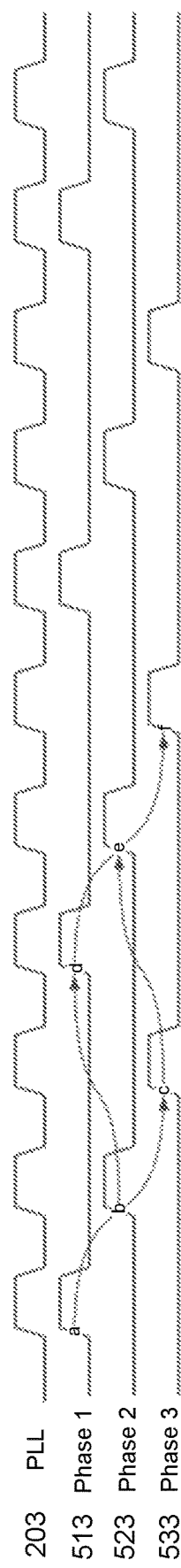
FIGS. 5A-5B show example timing diagrams of two sets of phase-delay multi-phase clock signals with a normal speed (FIG. 5A) and a slower speed (FIG. 5B), according to one or more implementations of the present disclosure.
Figure 5B:
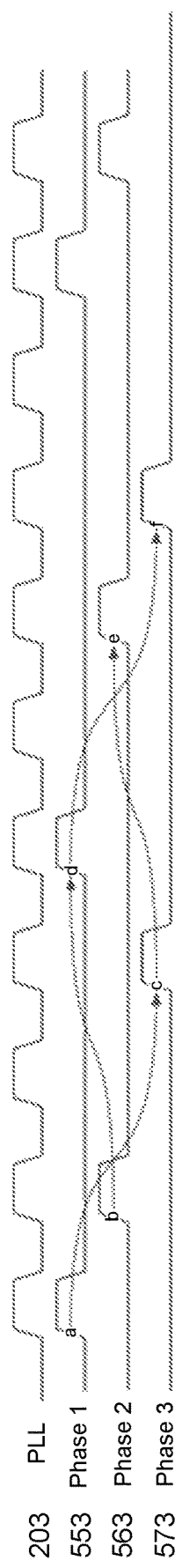

In some implementations, as illustrated in FIG. 2, the processing unit 200 includes a phase generator 210 and a computation engine (or computation unit) 220. The phase generator 210 is configured to receive a control signal 201 (e.g., from a corresponding control logic 114 of FIG. 1) and a reference clock signal (or PLL signal) 203 (e.g., from the PLL circuit 112 of FIG. 1) and output a set of multi-phase clock signals, including Phase 1 signal 211, Phase 2 signal 213, and Phase 3 signal 215, e.g., as illustrated in FIG. 5A or 5B. The computation engine 220 is configured to receive the set of multi-phase clock signals 211, 213, 215, perform a computation operation based on the set of multi-phase clock signals, and output a result 221 of the computation operation. The computation engine 220 can output the result 221 of the computation operation to an aggregation circuit (e.g., the aggregation circuit 118 of FIG. 1).

In some implementations, the computation engine 220 includes a plurality of latches and/or flip-flops, among other circuit components. The computation operation can be a cryptographic operation, e.g., a bitcoin double hash operation configured to find a nonce which meets a supplied difficulty threshold.

Figure 3:
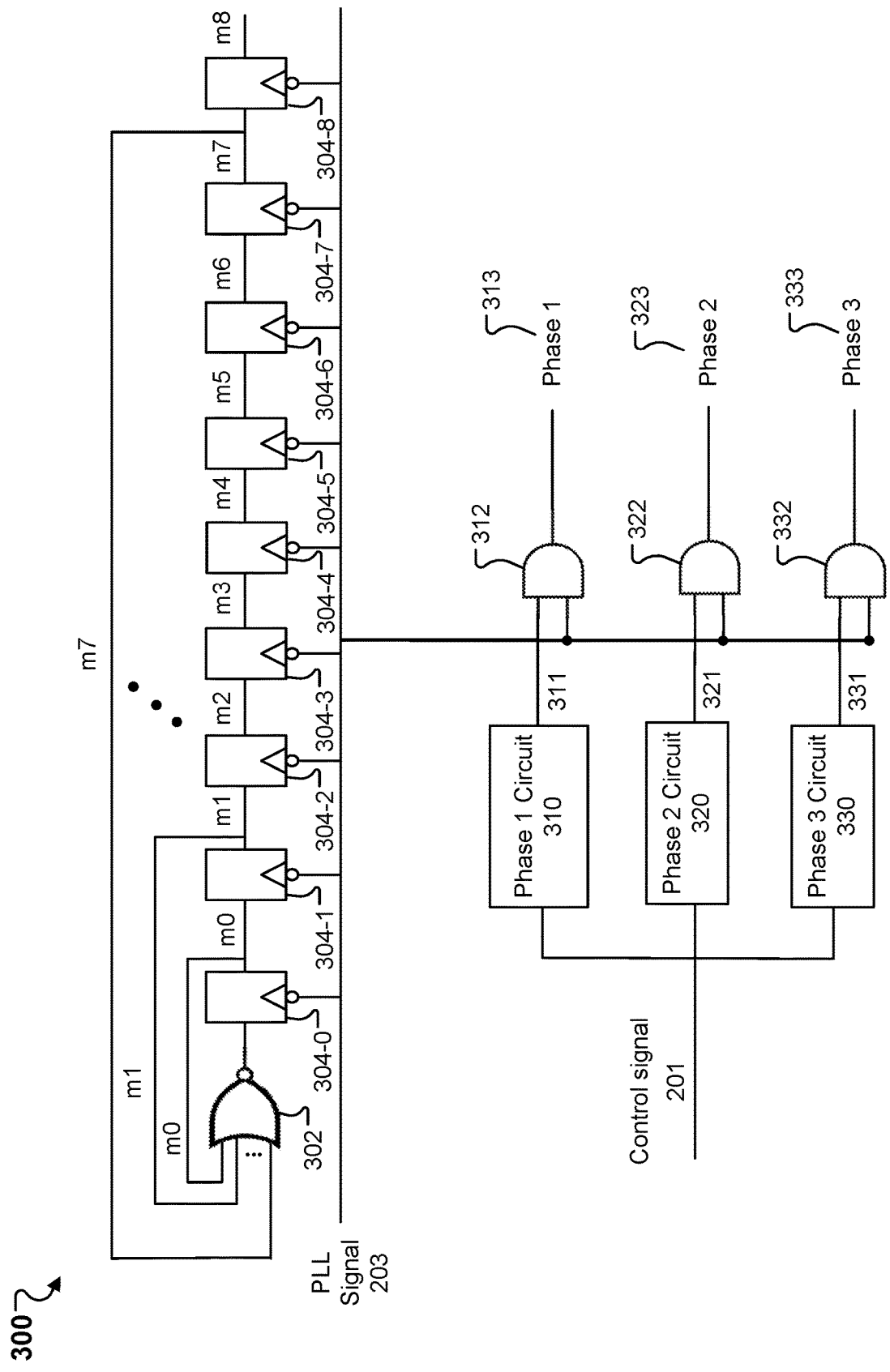
FIG. 3 illustrates a block diagram of an example phase generator, according to one or more implementations of the present disclosure.

In some implementations, the phase generator 210 is configured to selectively generate at least two sets of multi-phase clock signals based on the reference clock signal 203 and corresponding control signals 201, and the at least two sets of multi-phase clock signals having different respective frequencies, e.g., as discussed in further detail in FIG. 3.

FIG. 3 illustrates a block diagram of an example phase generator 300, according to one or more implementations of the present disclosure. The phase generator 300 can be implemented as the phase generator 210 of FIG. 2. The phase generator 300 is configured to generate two sets of multi-phase clock signals based on the reference clock signal 203 and corresponding control signals 201 and the two sets of multi-phase clock signals having different respective frequencies.

In some implementations, the two sets of multi-phase clock signals include a first set of multi-phase clock signals (e.g., as illustrated in FIG. 5A) generated based on the reference clock signal 203 and a first control signal 201 (e.g., representing a busy (or fast) status), and a second set of multi-phase clock signals (e.g., as illustrated in FIG. 5B) generated based on the reference clock signal 203 and a second control signal 201 (e.g., representing an idle (or slow) status). The second set of multi-phase clock signals can have a lower frequency or slower speed than the first set of multi-phase clock signals. A frequency of the first set of multi-phase clock signals can be based on the number of phases and a frequency of the reference clock signal 203. For example, if the multi-phase clock signals include 3 phases, the first set of multi-phase clock signals can have ⅓ of the frequency of the reference clock signal 203.

In some implementations, as illustrated in FIG. 3, the phase generator 300 includes a series of flip flops 304-0, 304-1, 304-2, . . . , 304-8 (referred to generally as flip-flops 304 and individually as flip-flop 304) that are coupled sequentially in series to a logic gate (e.g., an NOR gate) 302. Each flip-flop 304 stores a respective value, e.g., m0, m1, . . . , m7, m8. An output of each flip-flop 304 (except the last flip-flop 304-8) is coupled to an input of the NOR gate 302. Each flip-flop 304 is configured to receive the reference clock signal 203. The series of flip-flops 304 can be self-initialized and configured to have only one stored value being "1" and the other stored values being "0" at a time point.

In some implementations, as illustrated in FIG. 3, the phase generator 300 further includes three phase delay circuits 310, 320, 330 and corresponding logic gates (e.g., AND gate) 312, 322, 332. Each phase delay circuit 310, 320, 330 is coupled to outputs of one or more of flip-flops 304 and the control signal 201, as described in greater detail in FIGS. 4A-4C, and configured to generate a respective phase control signal 311, 321, 331 based on the control signal 201 and stored values at the outputs of the respective plurality of flip-flops 304. Each logic gate 312, 322, 332 includes a first input for receiving the reference clock signal 203 and a second input for receiving a respective phase clock signal 311, 321, 331, and an output for outputting a corresponding phase clock signal 313, 323, 333, e.g., the phase clock signal 211, 213, 215 of FIG. 2.

Figure 4A:
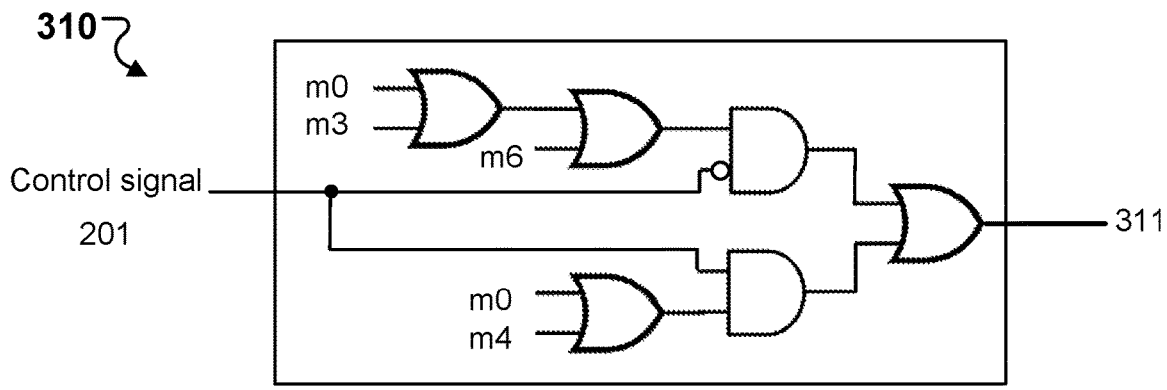
FIGS. 4A-4C illustrate block diagrams of example phase delay circuits, according to one or more implementations of the present disclosure.
Figure 4B:
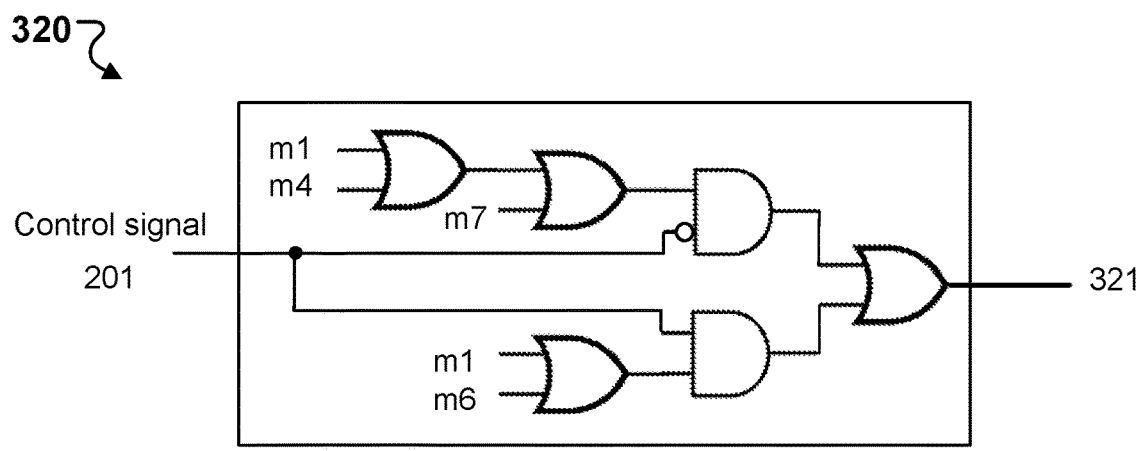
Figure 4C:
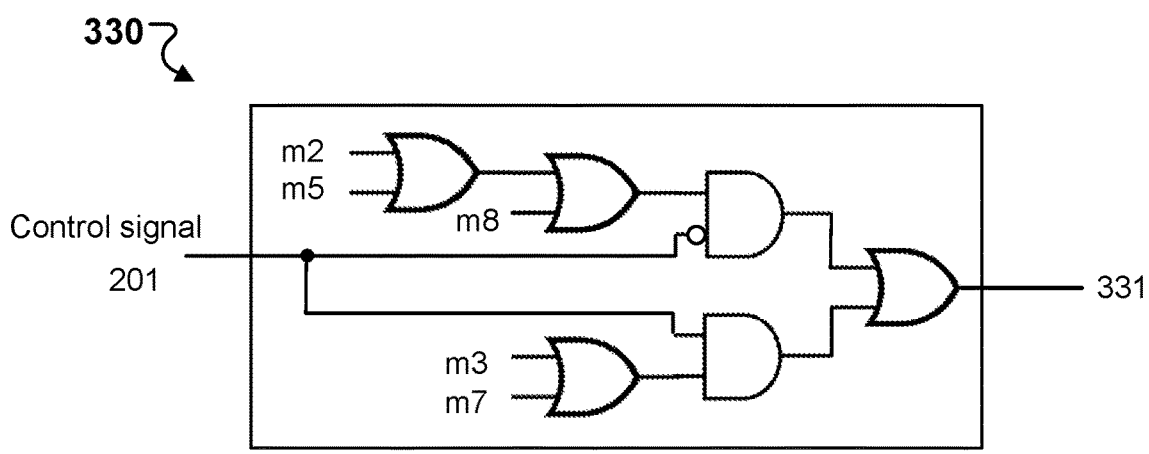

FIGS. 4A-4C illustrate block diagrams of example phase delay circuits 310, 320, 330, according to one or more implementations of the present disclosure. Each phase delay circuit 310, 320, 330 is configured to generate a phase clock signal 311, 321, 331 based on the same control signal 201 and stored values at the outputs of the respective plurality of flip-flops 304. The phase clock signals 311, 321, 333 can be, e.g., as illustrated in FIG. 5A or FIG. 5B.

In some implementations, the phase delay circuit 310 is configured to implement an expression: CS·(m0+m3+m6)+CS·(m0+m4), where CS represents a value of the control signal 201. FIG. 4A shows an example of the phase delay circuit 310. The phase delay circuit 310 includes four OR gates, two AND gates, and an inverter. A first OR gate has a first input configured to receive stored value m0 at an output of the first flip-flop 304-0, a second input configured to receive stored value m3 at an output of the fourth flip-flop 304-3, and an output coupled to a first input of a second OR gate. The second OR gate has a second input configured to receive stored value m6 at an output of the seventh flip-flop 304-6 and an output coupled to a first input of a first NAND gate. The first NAND gate has a second input configured to receive an inverted signal of the control signal 201 and an output coupled to a fourth OR gate. The inverted signal has a value of CS. A third OR gate has a first input configured to receive stored value m0 at the output of the first flip-flop 304-0, a second input configured to receive stored value m4 at an output of the fifth flip-flop 304-4, and an output coupled to a first input of a second NAND gate. The second NAND gate has a second input configured to receive the control signal 201 and an output coupled to a second input of the fourth OR gate. The fourth OR gate outputs the phase control signal 311. Thus, when the control signal 201 has a value (e.g., 0), representing running at a normal (or faster) speed, the phase control signal 311 sequentially has a value of m0, m3, m6, and accordingly the phase clock signal 313 has a phase delay of two clock cycles of the reference clock signal 203, e.g., as shown by phase clock signal 513 of FIG. 5A. When the control signal 201 has a value (e.g., 1), representing running at a slower (or retarded) speed, the phase control signal 311 sequentially has a value of m0, m4, and accordingly the phase clock signal 313 has a phase delay of three clock cycles of the reference clock signal 203, e.g., as shown by phase clock signal 553 of FIG. 5B. Thus, the phase clock signal 553 is 50% slower than the phase clock signal 513.

In some implementations, the phase delay circuit 320 is configured to implement an expression: CS. (m1+m4+m7)+ $\overline{CS}$. (m1+m6), where CS represents a value of the control signal 201. FIG. 4B shows an example of the phase delay circuit 320. The phase delay circuit 320 includes four OR gates, two AND gates, and an inverter. A first OR gate has a first input configured to receive stored value m1 at an output of the second flip-flop 304-1, a second input configured to receive stored value m4 at an output of the fifth flip-flop 304-4, and an output coupled to a first input of a second OR gate. The second OR gate has a second input configured to receive stored value m7 at an output of the eighth flip-flop 304-7 and an output coupled to a first input of a first NAND gate. The first NAND gate has a second input configured to receive an inverted signal of the control signal 201 and an output coupled to a fourth OR gate. The inverted signal has a value of $\overline{CS}$. A third OR gate has a first input configured to receive stored value m1 at the output of the second latch 304-1, a second input configured to receive stored value m6 at an output of the seventh flip-flop 304-6, and an output coupled to a first input of a second NAND gate. The second NAND gate has a second input configured to receive the control signal 201 and an output coupled to a second input of the fourth OR gate. The fourth OR gate outputs the phase control signal 321. Thus, when the control signal 201 has a value (e.g., 0), representing running at a normal (or faster) speed, the phase control signal 321 sequentially has a value of m1, m4, m7, and accordingly the phase clock signal 323 has a phase delay of two clock cycles of the reference clock signal 203, e.g., as shown by phase clock signal 523 of FIG. 5A. When the control signal 201 has a value (e.g., 1), representing running at a slower (or retarded) speed, the phase control signal 321 sequentially has a value of m1, m6, and accordingly the phase clock signal 323 has a phase delay of three clock cycles of the reference clock signal 203, e.g., as shown by phase clock signal 563 of FIG. 5B. Thus, the phase clock signal 563 is 50% slower than the phase clock signal 523.

In some implementations, the phase delay circuit 330 is configured to implement an expression: CS. (m2+m5+m8)+ $\overline{CS}$. (m3+m7), where CS represents a value of the control signal 201. FIG. 4C shows an example of the phase delay circuit 330. The phase delay circuit 320 includes four OR gates, two AND gates, and an inverter. A first OR gate has a first input configured to receive stored value m2 at an output of the third flip-flop 304-2, a second input configured to receive stored value m5 at an output of the sixth flip-flop 304-5, and an output coupled to a first input of a second OR gate. The second OR gate has a second input configured to receive stored value m8 at an output of the ninth flip-flop 304-8 and an output coupled to a first input of a first NAND gate. The first NAND gate has a second input configured to receive an inverted signal of the control signal 201 and an output coupled to a fourth OR gate. The inverted signal has a value of $\overline{CS}$. A third OR gate has a first input configured to receive stored value m3 at the output of the fourth flip-flop 304-3, a second input configured to receive stored value m7 at an output of the eighth flip-flop 304-7, and an output coupled to a first input of a second NAND gate. The second NAND gate has a second input configured to receive the control signal 201 and an output coupled to a second input of the fourth OR gate. The fourth OR gate outputs the phase control signal 331. Thus, when the control signal 201 has a value (e.g., 0), representing running at a normal (or faster) speed, the phase control signal 331 sequentially has a value of m2, m5, m8, and accordingly the phase clock signal 333 has a phase delay of two clock cycles of the reference clock signal 203, e.g., as shown by phase clock signal 523 of FIG. 5A. When the control signal 201 has a value (e.g., 1), representing running at a slower (or retarded) speed, the phase control signal 331 sequentially has a value of m3, m7, and accordingly the phase clock signal 333 has a phase delay of three clock cycles of the reference clock signal 203, e.g., as shown by phase clock signal 563 of FIG. 5B. Thus, the phase clock signal 563 is 50% slower than the phase clock signal 523.

Thus, when the control signal 201 has a value (e.g., 0), representing running at a normal (or faster) speed, the phase generator 300 generates a first set of multi-phase clock signals including phase signals 513, 523, 533 of FIG. 5A; when the control signal 201 has a value (e.g., 1), representing running at a slower (or retarded) speed, the phase generator 300 generates a second set of multi-phase clock signals including phase signals 553, 563, 573 of FIG. 5B. Accordingly, the second set of multi-phase clock signals is 50% slower than the first set of multi-phase clock signals. For example, if the reference clock signal has a frequency of $f_{ref}$, the first set of multi-phase clock signals can have a frequency of $f_{ref}/3$, and the second set of multi-phase clock signal can have a frequency of $f_{ref}/4.5$.

Note that for illustration purposes only, FIGS. 3 and 4A-4C describe a way to implement a phase generator to generate two different sets of multi-phase clock signals with a speed/frequency difference of 50%. The techniques implemented herein enable to implement phase generators to achieve any suitable speed/frequency difference, e.g., 10%, 20%, 30%, 40%, 60%, 70%, 80%, 90%, or any other difference.

Figure 6:
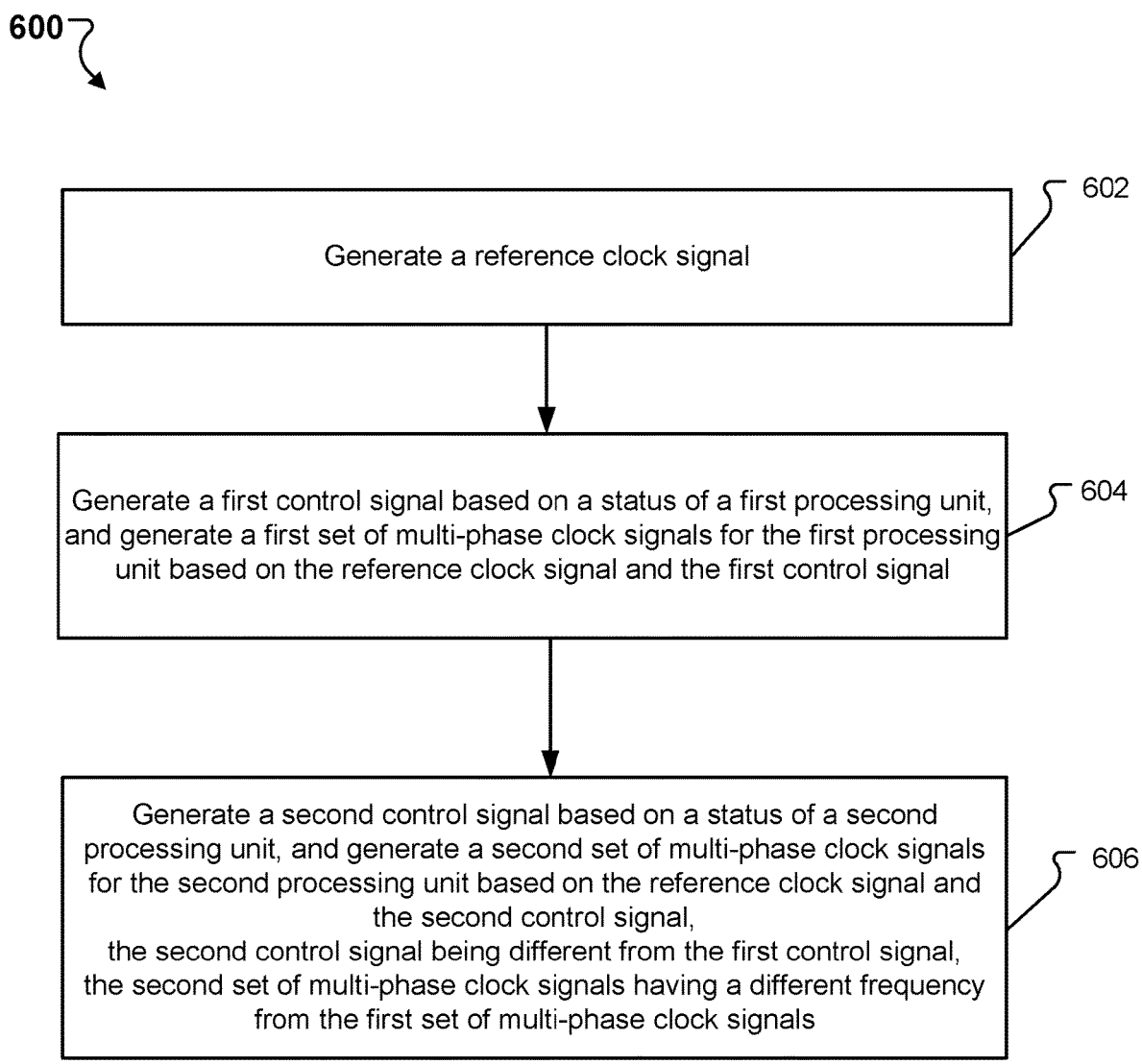
FIG. 6 is a flow chart of an example process for managing multi-phase clock signals for an integrated circuit device, according to one or more implementations of the present disclosure.

FIG. 6 is a flow chart of an example process 600 for managing multi-phase clock signals for an integrated circuit device, according to one or more implementations of the present disclosure. The process 600 can be performed by an integrated circuit device, e.g., the processing chip 110 of FIG. 1. The processing chip can include a plurality of processing units, e.g., the processing units 116 of FIG. 1 or the processor unit 200 of FIG. 2. The process 600 can also be performed by other integrated circuit devices in other implementations.

The integrated circuit device generates a reference clock signal (602). The integrated circuit device can include a clock signal generator (e.g., the PLL circuit 112 of FIG. 1). The clock signal generator is configured to generate the reference clock signal (e.g., the reference clock signal 203 of FIGS. 2, 3, and 5A-5B), for example, based on a master clock signal from a master clock source (e.g., the master clock source 104 of FIG. 1). The reference clock signal can have a higher frequency than the master clock signal.

The integrated circuit device generates a first control signal based on a status of a first processing unit, and generates a first set of multi-phase clock signals for the first processing unit based on the reference clock signal and a first control signal (604). The integrated circuit device generates a second control signal based on a status of a second processing unit, and generates a second set of multi-phase clock signals for the second processing unit based on the reference clock signal and a second control signal (606). The second control signal is different from the first control signal, and the second set of multi-phase clock signals has a different frequency from the first set of multi-phase clock signals. The first control signal or the second control signal can be similar to, or same as, the control signal 201 of FIGS. 2, 3, and 4A-4C.

In some implementations, each of the first processing unit and the second processing unit is configured to: generate the first set of multi-phase clock signals (e.g., as illustrated in FIG. 5A) based on the first control signal, and generate the second set of multi-phase clock signals (e.g., as illustrated in FIG. 5B) based on the second control signal.

In some implementations, each of the first processing unit and the second processing unit includes a phase generator (e.g., the phase generator 210 of FIG. 2 or the phase generator 300 of FIG. 3) and a computation unit (e.g., the computation engine 220 of FIG. 2). The phase generator is configured to selectively generate at least two sets of multi-phase clock signals based on the reference clock signal and corresponding control signals, the at least two sets of multi-phase clock signals having different respective frequencies. The computation unit is configured to perform at least one computing function based on a selected one of the at least two sets of multi-phase clock signals.

In some implementations, the integrated circuit device includes one or more control logics (e.g., the control logic 114 of FIG. 1). Each of the plurality of processing units is coupled to a respective control logic of the one or more control logics and configured to receive the corresponding control signals from the respective control logic. In some implementations, each of the corresponding control signals includes one or more configuration bits representing multiple different states. The respective control logic can be configured to generate a corresponding control signal based on a status of the processing unit.

In some examples, the respective control logic is configured to: based on a first status of the processing unit, generate a first control signal to cause the phase generator of the processing unit to generate a first set of multi-phase clock signals, and based on a second status of the processing unit, generate a second control signal to cause the phase generator of the processing unit to generate a second set of multi-phase clock signals. The first status can be a busy or faster operation status, and the second status can be an idle or slower operation status, A second frequency of the second set of multi-phase clock signals (e.g., the phase clock signals 553, 563, 573 of FIG. 5B) can be lower than a first frequency of the first set of multi-phase clock signals (e.g., the phase clock signals 513, 523, 533 of FIG. 5A). The first frequency of the first set of multi-phase clock signals can one third of a frequency of the reference clock signal, e.g., as illustrated in FIG. 5A.

In some examples, the second frequency is 50% lower than the first frequency. In some examples, a same phase clock signal (e.g., the phase clock signal 513, 523, or 533 of FIG. 5A) of the first set of multi-phase clock signals phase clock signal has a delay of two clock cycles of the reference clock signal, e.g., as illustrated in FIG. 5A. A same phase clock signal (e.g., the phase clock signal 553, 563, or 573 of FIG. 5B) of the second set of multi-phase clock signals has a delay of three clock cycles of the reference clock signal, e.g., as illustrated in FIG. 5B.

In some implementations, e.g., as illustrated in FIG. 3, the phase generator includes: multiple phase delay circuits (e.g., the phase delay circuits 310, 320, 330) and multiple logic gates (e.g., the AND gates 312, 322, 332). Each of the logic gates can be configured to: receive the reference clock signal and a phase control signal (e.g., the phase control signal 311, 321, or 331 of FIG. 3) from a respective phase delay circuit (e.g., 310, 320, or 330 of FIG. 3) of the multiple phase delay circuits, and generate a respective phase clock signal (e.g., the phase clock signal 313, 323, or 333 of FIG. 3) for a respective phase based on the reference clock signal and the phase control signal.

In some implementations, the phase generator further includes: a series of flip-flops (e.g., the flip-flops 304-0, 314-1, . . . , 314-8 of FIG. 3) that are sequentially coupled to one another. Each of the series of flip-flops is configured to store a respective stored value (e.g., m0, m1, . . . , m8 of FIG. 3). The processing unit is configured to receive a corresponding control signal (e.g., the control signal 201 of FIG. 3). Each of the multiple phase delay circuits is configured to: generate a respective phase control signal based on the corresponding control signal and a different corresponding set of selected stored values of the series of flip-flops.

In some implementations, the series of flip-flops includes a first flip-flop (e.g., 304-0 of FIG. 3), one or more middle flip-flops (e.g., 304-1 . . . 304-7 of FIG. 3), and a last flip-flop (e.g., 304-8 of FIG. 3) that are coupled in series. The phase generator can further includes a NOR logic gate (e.g., the NOR logic gate 302). The NOR logic gate has: inputs coupled to each of the first flip-flop and the one or more middle flip-flops and configured to receive stored values of the first flip-flop and the one or more middle flip-flops and an output coupled to the first flip-flop of the series of flip-flops. Each of the series of flip-flops is configured to receive the reference clock signal.

In some implementations, the series of flip-flops includes nine flip-flops, and the respective flip-flops values stored in the series of flip-flops include m0, m1, m2, . . . , m8, e.g., as illustrated in FIG. 3. The multiple phase delay circuits can include: a first phase delay circuit (e.g., the phase delay circuit 310 of FIG. 4A), a second phase delay circuit (e.g., the phase delay circuit 320 of FIG. 4B), and a third phase delay circuit (e.g., the phase delay circuit 330 of FIG. 4C). The first phase delay circuit can be configured to sequentially output m0, m3, m6 as a first phase control signal when the corresponding control signal represents a lower voltage level and sequentially output m0, m4 when the corresponding control signal represents a higher voltage level. The second phase delay circuit can be configured to sequentially output m1, m4, m7 as a second phase control signal when the corresponding control signal represents the lower voltage level and sequentially output m1, m6 when the corresponding control signal represents the higher voltage level. The third phase delay circuit can be configured to sequentially output m2, m5, m8 as a third phase control signal when the corresponding control signal represents the lower voltage level and sequentially output m3, m7 when the corresponding control signal represents the higher voltage level. Thus, when the control signal has a value (e.g., 0), representing running at a normal (or faster) speed, the phase generator generates a first set of multi-phase clock signals (e.g., the phase clock signals 513, 523, 533 of FIG. 5A); when the control signal has a value (e.g., 1), representing running at a slower (or retarded) speed, the phase generator generates a second set of multi-phase clock signals (e.g., the phase clock signals 553, 563, 573 of FIG. 5B). The second set of multi-phase clock signals can be 50% slower than the first set of multi-phase clock signals.

It is to be noted that although process steps, method steps, algorithms or the like may be described in a sequential order above, such processes, methods and algorithms may generally be configured to work in alternate orders, unless specifically stated to the contrary.

The processes and logic flows described in this document can be performed by one or more programmable processors executing one or more computer programs to perform the functions described herein. The processes and logic flows can also be performed by, and apparatus can also be implemented as, special purpose logic circuitry, for example, an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An integrated circuit device, comprising:
a clock signal generator configured to generate a reference clock signal; and
a plurality of processing units coupled to the clock signal generator, at least one of the plurality of processing units comprising:
a phase generator configured to selectively generate at least two sets of multi-phase clock signals based on the reference clock signal and corresponding control signals, the at least two sets of multi-phase clock signals having different respective frequencies; and
a computation unit configured to perform at least one computing function based on a selected one of the at least two sets of multi-phase clock signals.

2. The integrated circuit device of claim 1, further comprising one or more control logics,
wherein each processing unit of the at least one of the plurality of processing units is coupled to a respective control logic of the one or more control logics and configured to receive the corresponding control signals from the respective control logic.

3. The integrated circuit device of claim 2, wherein each of the corresponding control signals comprises one or more configuration bits representing multiple different states.

4. The integrated circuit device of claim 2, wherein the respective control logic is configured to generate a corresponding control signal based on a status of the processing unit.

5. The integrated circuit device of claim 4, wherein the respective control logic is configured to:
based on a first status of the processing unit, generate a first control signal to cause the phase generator of the processing unit to generate a first set of multi-phase clock signals, and
based on a second status of the processing unit, generate a second control signal to cause the phase generator of the processing unit to generate a second set of multi-phase clock signals,
wherein a second frequency of the second set of multi-phase clock signals is lower than a first frequency of the first set of multi-phase clock signals.

6. The integrated circuit device of claim 5, wherein the first frequency of the first set of multi-phase clock signals is one third of a frequency of the reference clock signal.

7. The integrated circuit device of claim 5, wherein the first status comprises a busy status or a fast operation status, and the second status comprises an idle status or a slow operation status.

8. The integrated circuit device of claim 5, wherein a same phase clock signal of the first set of multi-phase clock signals has a delay of two clock cycles of the reference clock signal, while a same phase clock signal of the second set of multi-phase clock signals has a delay of three clock cycles of the reference clock signal.

9. The integrated circuit device of claim 1, wherein the phase generator comprises multiple phase delay circuits and corresponding logic gates, and
wherein each of the logic gates is configured to:
receive the reference clock signal and a phase control signal from a respective phase delay circuit of the multiple phase delay circuits; and
generate a respective phase clock signal for a respective phase based on the reference clock signal and the phase control signal.

10. The integrated circuit device of claim 9, wherein the phase generator further comprises:
a series of flip-flops that are sequentially coupled to one another, each of the series of flip-flops being configured to store a respective stored value,
wherein the processing unit is configured to receive a corresponding control signal, and wherein each of the multiple phase delay circuits is configured to:
generate a respective phase control signal based on the corresponding control signal and a different corresponding set of selected stored values of the series of flip-flops.

11. The integrated circuit device of claim 10, wherein the series of flip-flops comprise a first flip-flop, one or more middle flip-flops, and a last flip-flop that are coupled in series,
wherein the phase generator further comprises a NOR logic gate having:
inputs coupled to each of the first flip-flop and the one or more middle flip-flops and configured to receive stored values of the first flip-flop and the one or more middle flip-flops; and
an output coupled to the first flip-flop of the series of flip-flops, and wherein each of the series of flip-flops is configured to receive the reference clock signal.

12. The integrated circuit device of claim 10, wherein the series of flip-flops comprise nine flip-flops, and the respective stored values stored in the series of flip-flops comprise m0, m1, m2, . . . , m8, and wherein the multiple phase delay circuits comprise:
a first phase delay circuit configured to sequentially output m0, m3, m6 as a first phase control signal when the corresponding control signal represents a lower voltage level and sequentially output m0, m4 when the corresponding control signal represents a higher voltage level,
a second phase delay circuit configured to sequentially output m1, m4, m7 as a second phase control signal when the corresponding control signal represents the lower voltage level and sequentially output m1, m6 when the corresponding control signal represents the higher voltage level, and
a third phase delay circuit configured to sequentially output m2, m5, m8 as a third phase control signal when the corresponding control signal represents the lower voltage level and sequentially output m3, m7 when the corresponding control signal represents the higher voltage level.

13. An apparatus, comprising:
a phase generator configured to selectively generate at least two sets of multi-phase clock signals based on a reference clock signal and corresponding control signals, the at least two sets of multi-phase clock signals having different respective frequencies; and
a computation unit configured to perform at least one computing function based on a selected one of the at least two sets of multi-phase clock signals.

14. The apparatus of claim 13, wherein the phase generator comprises:
multiple phase delay circuits; and
multiple logic gates,
wherein each of the logic gates is configured to:
receive the reference clock signal and a phase control signal from a respective phase delay circuit of the multiple phase delay circuits; and
generate a respective phase clock signal for a respective phase based on the reference clock signal and the phase control signal.

15. The apparatus of claim 14, wherein the phase generator further comprises:
a series of flip-flops that are sequentially coupled to one another, each of the series of flip-flops being configured to store a respective stored value,
wherein the apparatus is configured to receive a corresponding control signal, and wherein each of the multiple phase delay circuits is configured to:
generate a respective phase control signal based on the corresponding control signal and a different corresponding set of selected stored values of the series of flip-flops.

16. The apparatus of claim 15, wherein the series of flip-flops comprise a first flip-flop, one or more middle flip-flops, and a last flip-flop that are coupled in series,
wherein the phase generator further comprises a NOR logic gate having:
inputs coupled to each of the first flip-flop and the one or more middle flip-flops and configured to receive stored values of the first flip-flop and the one or more middle flip-flops; and
an output coupled to the first flip-flop of the series of flip-flops, and
wherein each of the series of flip-flops is configured to receive the reference clock signal.

17. The apparatus of claim 15, wherein the series of flip-flops comprise nine flip-flops, and the respective stored values stored in the series of flip-flops comprise m0, m1, m2, . . . , m8, and wherein the multiple phase delay circuits comprise:
a first phase delay circuit configured to sequentially output m0, m3, m6 as a first phase control signal when the corresponding control signal represents a lower voltage level and sequentially output m0, m4 when the corresponding control signal represents a higher voltage level,
a second phase delay circuit configured to sequentially output m1, m4, m7 as a second phase control signal when the corresponding control signal represents the lower voltage level and sequentially output m1, m6 when the corresponding control signal represents the higher voltage level, and
a third phase delay circuit configured to sequentially output m2, m5, m8 as a third phase control signal when the corresponding control signal represents the lower voltage level and sequentially output m3, m7 when the corresponding control signal represents the higher voltage level.

18. The apparatus of claim 13, wherein the phase generator is configured to:
receive a first control signal and generate a first set of multi-phase clock signals based on the first control signal and the reference clock signal; and
receive a second control signal and generate a second set of multi-phase clock signals based on the second control signal and the reference clock signal,
wherein the second control signal indicates an idle status, and the first control signal indicates a busy status, and wherein a second frequency of the second set of multi-phase clock signals is lower than a first frequency of the first set of multi-phase clock signals.

19. A method, comprising:
generating a reference clock signal;
generating a first control signal based on a status of a first processing unit, and generating a first set of multi-phase clock signals for the first processing unit based on the reference clock signal and a first control signal; and
generating a second control signal based on a status of a second processing unit, and generating a second set of multi-phase clock signals for the second processing unit based on the reference clock signal and a second control signal,
wherein the second control signal is different from the first control signal, and the second set of multi-phase clock signals has a different frequency from the first set of multi-phase clock signals.

20. The method of claim 19, wherein each of the first processing unit and the second processing unit is configured to:
generate the first set of multi-phase clock signals based on the first control signal, and
generate the second set of multi-phase clock signals based on the second control signal.

* * * * *